US008527789B2

(12) United States Patent
Khatri et al.

(10) Patent No.: US 8,527,789 B2
(45) Date of Patent: Sep. 3, 2013

(54) SYSTEM AND METHOD OF MODIFYING POWER USE WITHIN AN INFORMATION HANDLING SYSTEM

(75) Inventors: Mukund P. Khatri, Austin, TX (US); John S. Loffink, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 1237 days.

(21) Appl. No.: 11/837,802

(22) Filed: Aug. 13, 2007

(65) Prior Publication Data
US 2009/0049316 A1 Feb. 19, 2009

(51) Int. Cl.
*G06F 1/00* (2006.01)
*G06F 1/26* (2006.01)
*G06F 1/32* (2006.01)

(52) U.S. Cl.
USPC .......................................... 713/320; 713/300

(58) Field of Classification Search
USPC ................................. 713/300, 320
See application file for complete search history.

(56) References Cited

U.S. PATENT DOCUMENTS

| 5,719,800 | A | 2/1998 | Mittal et al. | |
|---|---|---|---|---|
| 6,721,892 | B1 | 4/2004 | Osborn et al. | |
| 6,804,792 | B2 * | 10/2004 | Nishikawa | 713/323 |
| 7,051,215 | B2 * | 5/2006 | Zimmer et al. | 713/300 |
| 7,058,826 | B2 | 6/2006 | Fung | |
| 2005/0044429 | A1 * | 2/2005 | Gaskins et al. | 713/300 |
| 2005/0138438 | A1 * | 6/2005 | Bodas | 713/300 |
| 2005/0182978 | A1 * | 8/2005 | Anderson et al. | 713/300 |
| 2006/0156041 | A1 | 7/2006 | Zaretsky et al. | |
| 2006/0230299 | A1 | 10/2006 | Zaretsky et al. | |
| 2006/0265617 | A1 * | 11/2006 | Priborsky | 713/320 |
| 2007/0067657 | A1 * | 3/2007 | Ranganathan et al. | 713/320 |

OTHER PUBLICATIONS

U.S. Appl. No. 11/381,926, filed May 5, 2006.

* cited by examiner

*Primary Examiner* — Mark Connolly
(74) *Attorney, Agent, or Firm* — Larson Newman, LLP (57) ABSTRACT

A system and method of modifying power use within an information handling system is disclosed. In one form, a method of managing power within an information handling system is disclosed. The method can include establishing a threshold power level of a first information handling system, and detecting a first power demand of a first operating state in excess of the threshold power level. The method can also include detecting a request to invoke a first forced reduced power state of the first information handling system, and determining a first alternative power state different from the threshold power level and the first forced reduced power state. The method can further include initiating the first alternative power state.

18 Claims, 5 Drawing Sheets

SYSTEM AND METHOD OF MODIFYING POWER USE WITHIN AN INFORMATION HANDLING SYSTEM

FIELD OF THE DISCLOSURE

This disclosure relates generally to information handling systems, and more particularly to a system and method of modifying power use within an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can be configured to use a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a wireless communication device, a diskless computer system, a thin client, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

According to one aspect of the disclosure, a method of managing power within an information handling system is disclosed. The method can include establishing a threshold power level of a first information handling system, and detecting a first power demand of a first operating state in excess of the threshold power level. The method can also include detecting a request to invoke a first forced reduced power state of the first information handling system, and determining a first alternative power state, wherein the first alternative power state is different from the threshold power level and the first forced reduced power state. The method can further include initiating the first alternative power state.

According to another aspect of the disclosure, a power management system is disclosed. The power management system can include a management controller operably coupled to a BIOS of a first information handling system, the management controller operable to manage allocation of power sufficient to satisfy a first power demand of the first information handling system. The power management system can also include a monitor accessible to the management controller, the monitor operable to monitor the first power demand, and a power distribution system coupled to the information handling system. In one form, the power distribution system can be operable to receive a first alternative power output generated in response to a detected first forced reduced power state.

According to a further aspect of the disclosure, an information handling system is disclosed. The information handling system can include a processor operable to receive a request to invoke a first forced reduced power state. In one form, the processor can be operable to reduce an operating state to a minimal operating level. The information handling system can also include a power distribution system coupled to the processor and responsive to the first forced reduced power state and a first alternative power state. In one form, the first alternative power state can be generated in response to a request to initiate the first forced reduced power state.

Figure 1:
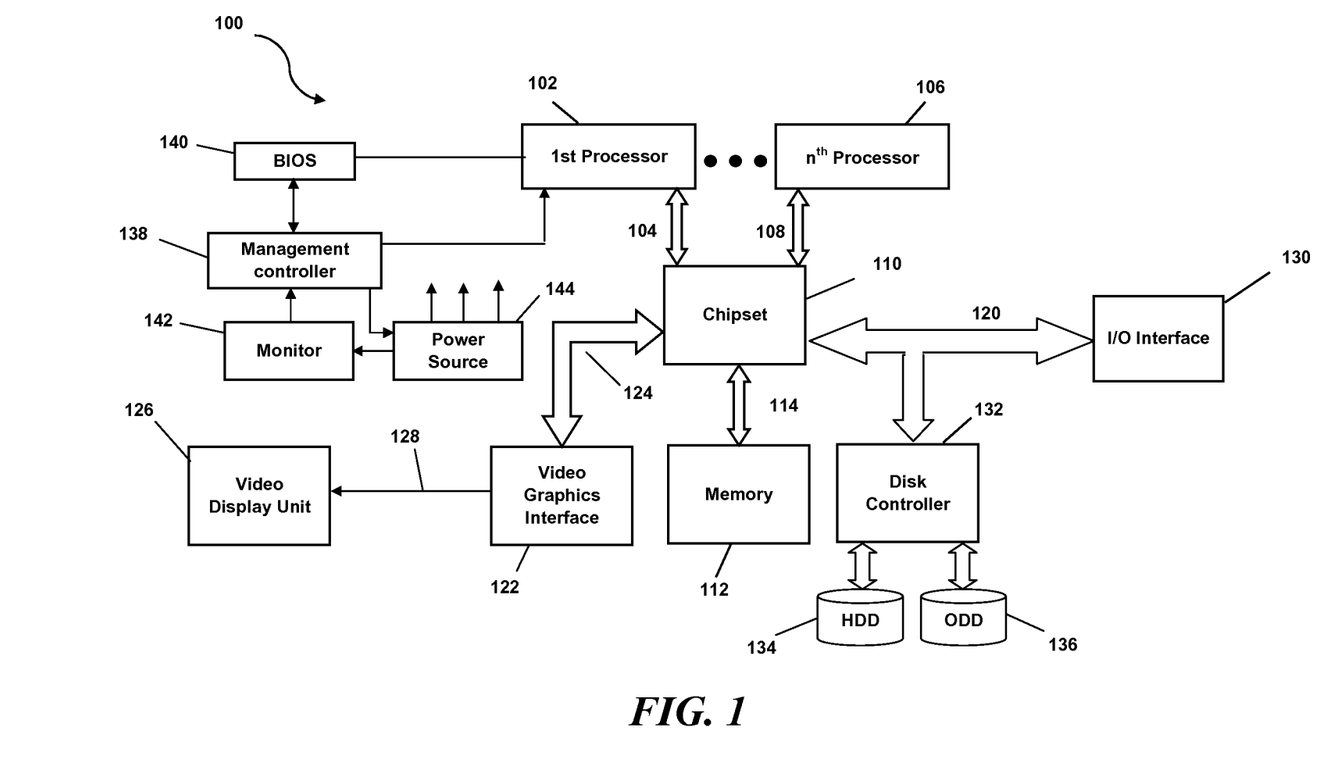
FIG. 1 illustrates a block diagram of an information handling system according to one aspect of the disclosure.

FIG. 1 illustrates a block diagram of an exemplary embodiment of an information handling system, generally designated at 100. In one form, the information handling system 100 can be a computer system such as a server. As shown in FIG. 1, the information handling system 100 can include a first physical processor 102 coupled to a first host bus 104 and can further include additional processors generally designated as physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include a dedicated bus to transfer data between first physical processor 102 and the $n^{th}$ physical processor 106. For example, the chipset 110 including a chipset that can include a memory controller hub and an input/output (I/O) controller hub. As a memory controller hub, the chipset 110 can function to access the first physical processor 102 using first bus 104 and the $n^{th}$ physical processor 106 using the second host bus 108. The chipset 110 can also be used as a memory interface for accessing memory 112 using a memory bus 114. In a particular embodiment, the buses 104, 108, and 114 can be individual buses or part of the same bus. The chipset 110 can also include bus control and can handle transfers between the buses 104, 108, and 114.

According to another aspect, the chipset 110 can include an application specific chipset that connects to various buses, and integrates other system functions. For example, the chipset 110 can include using an Intel® Hub Architecture (IHA) chipset that can also include two parts, a Graphics and AGP Memory Controller Hub (GMCH) and an I/O Controller Hub (ICH). For example, an Intel 820E, an 815E chipset, an Intel 975X chipset, an Intel G965 chipset, available from the Intel Corporation of Santa Clara, Calif., or any combination thereof, can be used as at least a portion of the chipset 110. The chipset 110 can also be packaged as an application specific integrated circuit (ASIC).

In one form, the chipset 110 can be coupled to a video graphics interface 122 using a third bus 124. In one form, the video graphics interface 122 can be a Peripheral Component Interconnect (PCI) Express interface operable to content to display within a video display unit 126. Other graphics interfaces may also be used. The video graphics interface 122 can output a video display output 128 to the video display unit 126. The video display unit 126 can include one or more types of video displays such as a flat panel display (FPD), cathode ray tube display (CRT) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a PCI bus or a high speed PCI-Express bus. In one embodiment, a PCI bus can be operated at approximately 66 MHz and a PCI-Express bus can be operated at more than one (1) speed (e.g. 2.5 GHz and 5 GHz). PCI buses and PCI-Express buses can comply with industry standards for connecting and communicating between various PCI-enabled hardware devices. Other buses can also be used in association with, or independent of, the I/O bus 120 including, but not limited to, industry standard buses or proprietary buses, such as Industry Standard Architecture (ISA), Small Computer Serial Interface (SCSI), Inter-Integrated Circuit (I2C), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the nth physical processor 106. The chipset 110 can also include a Southbridge portion (not illustrated) of the chipset 110 and can handle I/O functions of the chipset 110. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a disk controller 132 coupled to the I/O bus 120, and connecting one or more internal disk drives such as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive.

In one form, the information handling system 100 can include a management controller 138 coupled to a BIOS 140 and the first processor 102. The management controller 138 can also be coupled to a monitor 142 operable to monitor a power demand of the information handling system 100 employing a power source 144. In one form, the management controller 138, the monitor 142, the power source 144, or any combination thereof, can be provided as a part of the information handling system 100, or can be provided as a separately as desired. The management controller 138 and the monitor 142 can be coupled to a power source 144 operable to output one or more power output levels to the information handling system 100.

During operation, the monitor 142 can detect a power demand of the information handling system 100 that may exceed a threshold power level of the information handling system 100. Additionally, the management controller 138 can receive an input from the monitor 142 and can issue a forced reduced power state request to the first processor 102 to reduce or throttle use of portions or all of the information handling system 100 resulting in a forced reduced power state. The management controller 138 can also determine an alternative power state upon detecting the forced reduced power state, and initiate using the alternative power state. For example, an alternative power state can be realized by providing a power output level that can be less than the threshold power level, but greater than the forced reduced power state. In this manner, the information handling system 100 can realize an operating state greater than the forced reduced operating state during periods of relative increased power demands.

Figure 2:
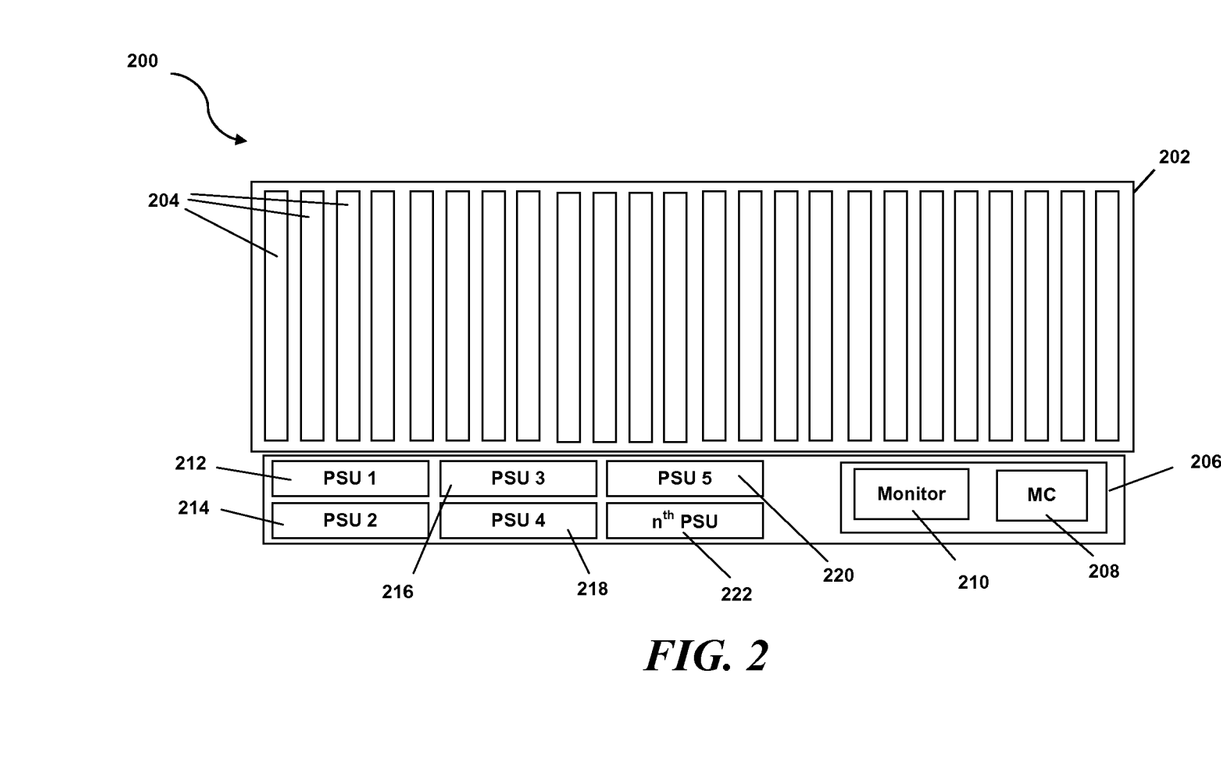
FIG. 2 illustrates a functional block diagram of a server rack including a power monitor and distribution system according to one aspect of the disclosure.

FIG. 2 illustrates a functional block diagram of a power management system, generally illustrated at 200, and including a server rack 202 housing a plurality of servers or blade servers 204. The power management system 200 can also include a power chassis 206 including a management controller 208 and a monitor 210. The power chassis 206 also be couple to a first power supply unit (PSU) 212, as second PSU 214, a third PSU 216, a fourth PSU 218, a fifth PSU 220, an nth PSU 222, or any combination thereof. One or more PSU can be accessed by the power chassis 206 to output power level to one or more blade servers 204. During operation, each blade server 204 can be allocated an amount of power using the management controller 208. In one form, one or more power threshold levels can be monitored by the monitor 210. Upon one of the blade servers 204 exceeding a threshold level, the management controller 208 can issue a forced reduced power state to the specific blade server exceeding the threshold power level. In another form, the management controller 208 can access a profile of the reduced server, and determine an alternative power state to operate the specific blade server placed in a forced reduced operating state. For example, each blade server can include a specific configuration and utilization rate stored within a profile that can be stored within the specific server and accessed by the management controller 208. As such, the management controller 208 can determine an alternative power state to operate the specific blade server. In one form, the blade servers 204 can maintain a specific alternative power setting value operable to be used in association with a forced reduced power state.

In another aspect, the management controller 208 can adapt to a power requirement of the server placed in a forced reduced power state. For example, the management controller 208 can set the alternative power output level to a first level, and if the power demand of the blade server is too great, and the threshold power level is exceeded, the management controller 208 can establish an alternative voltage level less than the previously output alternative power output level. In this manner, the alternative power output level can adapt to a level sufficient to enable use of the server, without having to set the output to a forced power state, which can significantly impact performance of the specific blade server.

Figure 3:
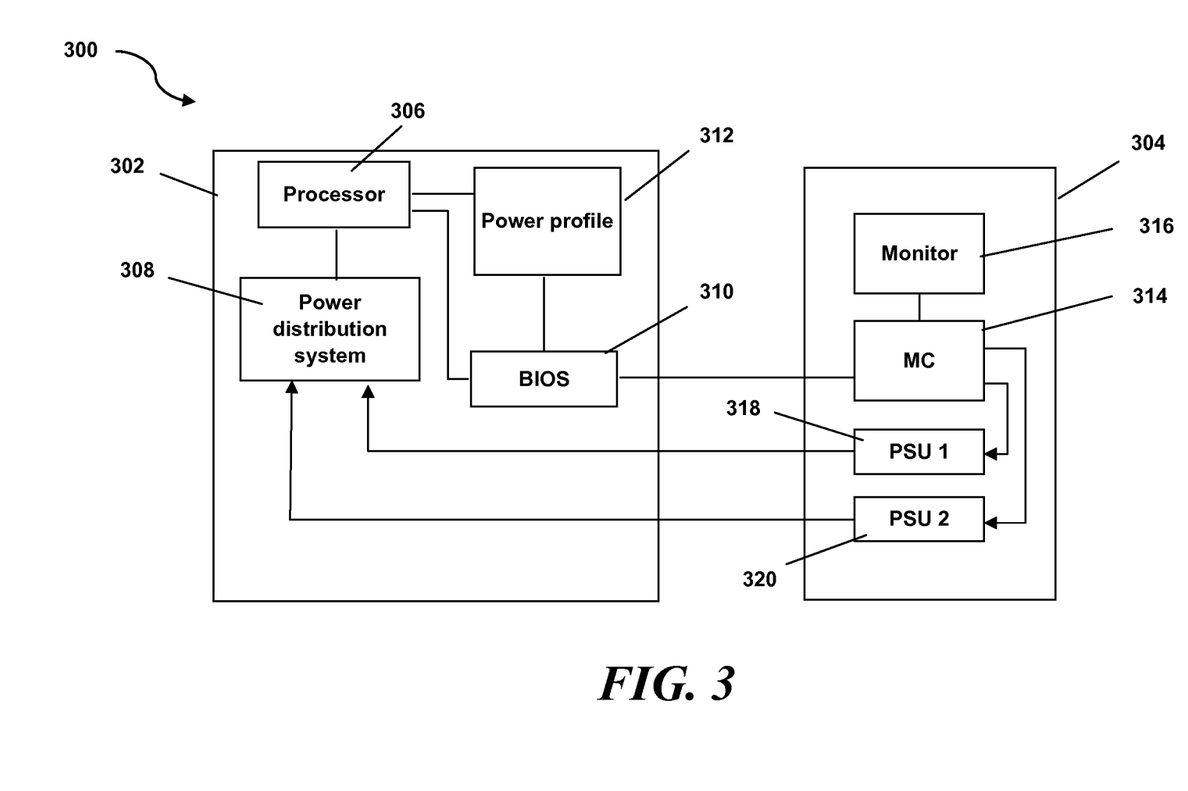
FIG. 3 illustrates a functional block diagram of a power monitor and distribution system according to another aspect of the disclosure.

FIG. 3 illustrates a functional block diagram of a power management and distribution system, illustrated generally as power management system 300 that includes an information handling system 302 coupled to a power chassis 304. In one form, the information handling system 302 can be realized as one of the blade servers 204 illustrated in FIG. 2, the information handling system 100 illustrated in FIG. 1, or any other type of system that can be employed with the power management system 300. In one form, the power chassis 304 can be realized as the power chassis 206 illustrated in FIG. 2 or any other type of power system that can be employ the power management system 300.

The information handling system 302 can include a processor 306, a power distribution system 308, a BIOS 310, and an associated power profile that can include a threshold power level, one or more alternative power settings, various other types of information that can be used to alter a power level or operating state of the information handling system 302, or any combination thereof. In one form, the BIOS 310 can be coupled to a management controller 314 operably coupled to the power chassis 304. In one form, the BIOS 310 can be used to initiate outputting an alternative power state. For example, the BIOS 310 can couple an input to the processor 306 to initiate altering a power state of the processor 306 or another component or device accessible to the power management system 300. The management controller 314 can be coupled to a monitor 316 operable to monitor a threshold power level of the information handling system 302. The management controller 314 can be used to allocate power output by a first PSU 318 to the information handling system 302. In one form, a second PSU 320 can be used during increased power demands. In other forms, the second PSU 320 can be used as a redundant power source in the event the first PSU 318 fails.

Figure 4:
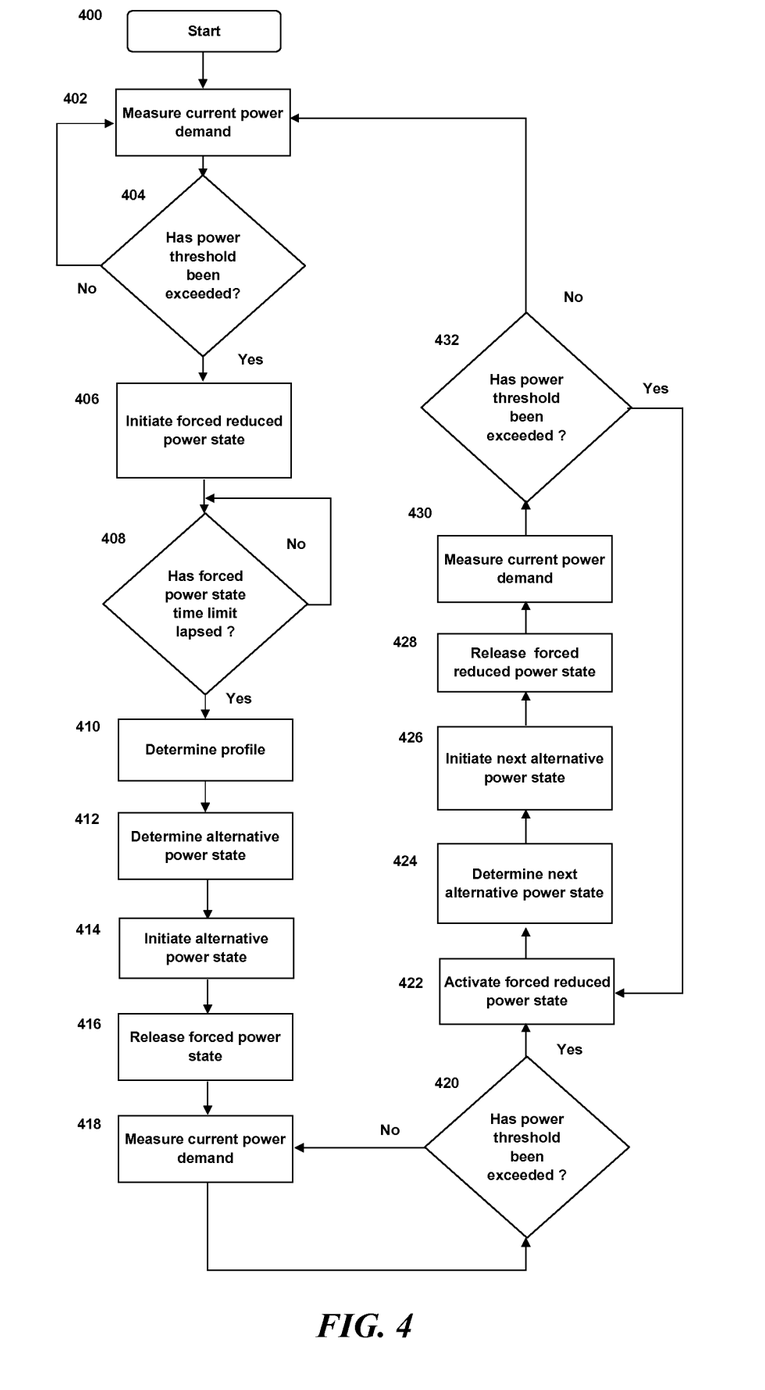
FIG. 4 illustrates a flow diagram of a method of modifying power use of an information handling system according to one aspect of the disclosure.

FIG. 4 described below illustrates one method of using the power management system 300. According to another aspect, the power management system 300 can employ using sideband or out-of-band network signals to initiate outputting an alternative power state. For example, the management controller 314 can be accessed using an out-of-band network interface (not illustrated) to initiate an alternative power state. Upon receipt of an out-of-band network signal including a request to initiate an alternative power state, the management controller 314 can couple an input to the processor 306 to initiate the alternative power state as desired.

FIG. 4 illustrates a flow diagram of a method of enabling use of power within information handling systems according to one aspect of the disclosure. FIG. 4 can be employed in whole, or in part, by the information handling system 100 depicted in FIG. 1, the system 200 described in FIG. 2, the system 300 illustrated in FIG. 3, or any other type of system, controller, device, module, processor, or any combination thereof, operable to employ all, or portions of, the method of FIG. 4. Additionally, the method can be embodied in various types of encoded logic including software, firmware, hardware, or other forms of digital storage mediums, computer readable mediums, or logic, or any combination thereof, operable to provide all, or portions, of the method of FIG. 4.

The method begins generally at block 400. At block 402, a current power demand can be measured using a monitor operably coupled to a management controller. In one form, the management controller can access a monitor and can allocate a power level and associated power output to be used by an information handling system. The monitor can be provided a part of the management controller and in other forms, can be an external module or logic accessible to the management controller. In one form, the management controller employing the monitor can detect or measure a current power demand of one or more information handling systems, devices, processors, memory devices, storage devices, controllers, or any combination thereof. Upon measuring a current power demand, the method can proceed to decision block 404 and the measured current power demand can be compared to a threshold power level to determine if the measure current power has exceeded a threshold power level.

If at decision block 404 the threshold power level has not been exceeded, the method can proceed to block 402 and repeats. If at decision block 404, the threshold power level has been exceeded, the method can proceed to block 406, and a forced reduced power state can be initiated to reduce an operating condition to a minimal operating state or another forced reduced level sufficient to reduce the power demand to a level less than the power threshold. Upon activating the forced reduced power state, the method can then proceed to decision block 408 and determines if a time limit of the forced power state has elapsed. If at decision block 408, the time limit has not elapsed, the method can maintain the forced power state and repeats. If at decision block 408, a time limit has elapsed, the method can proceed to block 410, and a profile of the reduced information handling system, device, processor, etc. can be determined. For example, a profile can include configuration and usage information of the information handling system, device, processor, etc. that can be used to determine or generate an alternative power demand.

Upon determining the profile, the method can proceed to block 412 and an alternative power state can be determined. For example, an alternative power state can be generated using an alternative power level that can be less than a threshold power level, and in some forms greater than a forced reduced power level. As such, upon determining an alternative power state, the method can proceed to block 414 and an alternative power state can be initiated by outputting a alternative power level to the information handling system, device, processor, etc. in the forced reduced power state. Upon initiating the alternative power level, the method can proceed to block 416, and the forced power state can be released. A forced reduced power state command can be cleared and use of the alternative power level and resulting alternative power state can be employed.

The method can then proceed to block 418, and the current power demand can be measured. The method can then proceed to decision block 420 and, if the power threshold level has not been exceeded, the method can proceed to block 418 and repeats. If at decision block 420, the power threshold level has been exceeded, the method can proceed to block 422 and a forced reduced power state can be activated. For example, the forced reduced power state can be the same or different as the previous reduced power state employed at block 406. The method can then proceed to block 424, and determines a next alternative power state and power level to employ. For example, the next alternative power state can include outputting a second alternative power level that may be less than the first alternative power level, but greater than the second forced reduced power state. Other second alternative power states and power levels can also be used as desired.

Upon determining a second alternative power state, the can proceed to block 426, and the next alternative power state can be initiated. For example, a next alternative power level can be output to the information handling system, processor, device, etc. to initiate a next alternative power state. The method can then proceed to block 428, and the forced reduced power state can be released. The method can then proceed to block 430 and the current power demand can be measured using the next alternative power state. If at decision block 432, the threshold power level has not been exceeded, the method can proceed to block 402 and repeats. If the threshold power level has been exceeded, the method can proceed to block 422, and a forced reduced power state can be activated, and another alternative power state and associated alternative power level can be determined at block 424. The method can then proceed as described above.

Figure 5:
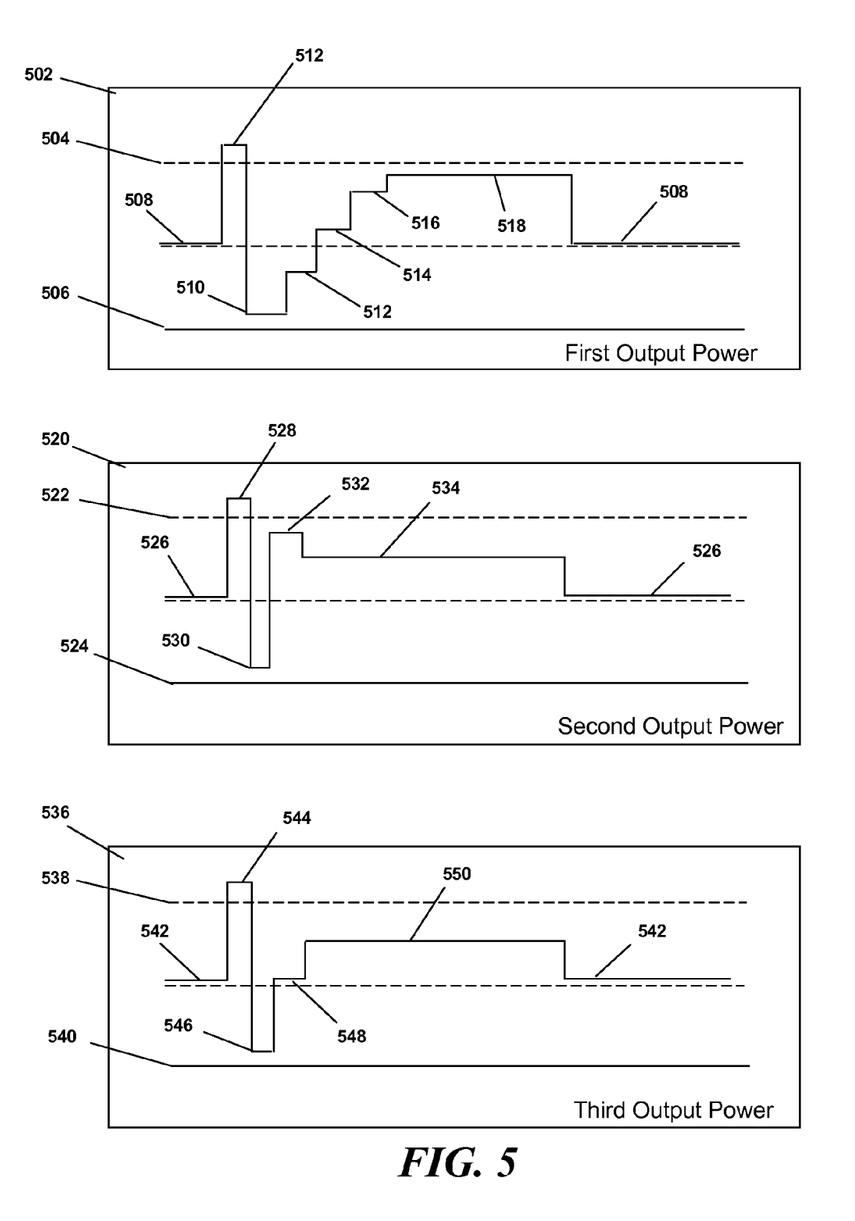
FIG. 5 illustrates several timing diagrams depicted managing forced power states according to various aspects of the disclosure.

FIG. 5 illustrates several timing diagrams of managing forced reduced power states according to various aspects of the disclosure. In one form, a first power output 502 illustrates a method of outputting a stepped power level in response to detecting a forced reduced power demand in response to exceeding a threshold power level. For example, the method can include a threshold power level 504, and a minimal power level 506. A first power operating state 508 can transition to a high power demand level 512 that exceeds the threshold power level 504. The first power output 502 can be reduced to a forced reduced power output level 510. The first power output 502 can then be increased to a first alternative power state 512, a second alternative power state 514, a third alternative power state 516, and a fifth alternative power state 518. Each operating state can be less than the threshold level 504 and in one form, the fifth alternative power state 518 can be maintained as desired, or returned to the first power operating state 508 as desired.

According to another aspect, a second power output 520 illustrates a method of outputting a stepped power level from a relative high value in response to detecting a power demand that exceeds a threshold power level. For example, the second power output 520 can include stepping a power output from a relative high value that may be less than a threshold power level 522 and greater than a minimal or non-operational power level 524. The second power output 520 can include a first power operating state 526 that can be increased due to a power demand 528 that exceeds the threshold power level 522. The second power output 520 can be reduced to a forced reduced power output level 530. The second power output 502 can then be increased to a first alternative power state 532 that can be near to the threshold power level. The second power output 520 can then be stepped to a second alternative power state 534, and to the first power state as the power demand reduces. In one form, the second alternative power state 534 may exceed the threshold power level 522 (not illustrated). As such, a second forced reduced power state may be provided, and the second alternative power state 534, that may be less than the first alternative power state 532, can be employed.

According to another aspect, a third power output 536 illustrates a method of outputting a stepped power level using a binary search method relative to a threshold power level. For example, the third power output 536 can include initially enabling a power output level at approximately half threshold power level in response to detecting a forced reduced power state. For example, the third power output 536 can include a threshold power level 538, and a minimal or non-operational power level 540. The third power output 536 can also include a first power operating state 542 that can be increased due to a power demand 544 that exceeds the threshold power level 538. The third power output 536 can be reduced to a forced reduced power output level 546. The third power output 536 can then be increased to first alternative power level 548 that can be approximately half the threshold power level 538. The third power output 536 can then be increased to a value that may be one half the difference between the first alternative power state 538, and the threshold power state 538 to output a second threshold power state 550. The second threshold power state 550 can then be altered to the first power state 542 as desired.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of managing power within an information handling system, comprising:
   establishing a threshold power level of a first information handling system;
   detecting a first power demand of a first operating state in excess of the threshold power level;
   detecting a request to invoke a first forced reduced power state of the first information handling system;
   initiating the first forced reduced power state;
   receiving, from the first information handling system, a request to initiate a first alternative power state via an out-of-band network signal;
   determining the first alternative power state based on a first profile of the first information handling system, wherein the first profile includes a specific configuration of components to be powered within the first information handling system, wherein the first alternative power state is between the threshold power level and the first forced reduced power state;

initiating the first alternative power state;
releasing the first forced reduced power state of the first information handling system;
detecting a second forced reduced power state of the first information handling system, wherein the second forced reduced power state is greater than the first forced reduced power state and the second forced reduced power state is in response to the first alternative power level exceeding the threshold level; and
outputting a second alternative power level to the first information handling system based on a second alternative power state, wherein the second alternative power level is less than the first alternative power level, wherein the second alternative power level is in response to the detection of the second forced reduced power state and based on a second profile of the first information handling system.

2. The method of claim 1, further comprising:
determining the first alternative power state from an operating characteristic of the first information handling system; and
outputting the first alternative power state in response to determining the operating characteristic.

3. The method of claim 1, further comprising:
detecting a second power demand upon outputting the first alterative power state;
determining whether the first alternative power state is sufficient to satisfy the second power demand; and
maintaining the first alternative power state in response to the determining whether the first alternative power state is sufficient.

4. The method of claim 1, further comprising:
detecting a request to invoke a second forced reduced power state of the first information handling system;
determining whether the second alternative power state is sufficient; and
releasing the second forced reduced power state.

5. The method of claim 1, further comprising:
detecting a request to invoke a second forced reduced power state of the information handling system; and
releasing the second forced reduced power state.

6. The method of claim 1, further comprising:
detecting the first forced reduced power state request using a management controller;
receiving an indication of the first forced reduced power state using a BIOS of the first information handling system;
releasing the first forced reduced power state request using the BIOS; and
initiating the first alternative power state using the management controller.

7. The method of claim 1, further comprising:
setting the first alternative power state to a power level proximal to the threshold power level;
detecting a second forced reduced power state request;
outputting a second alternative power state at a level less than the first alternative power state;
releasing the first alternative power state; and
releasing the second forced reduced power state request.

8. The method of claim 1, further comprising:
setting the first alternative power state to a level proximal to the first forced reduced power state;
detecting a second power demand of a second information handling system; and
outputting the first alternative power state to satisfy at least a portion of the first power demand.

9. The method of claim 1, further comprising:
storing the threshold power level within a memory accessible by a management controller;
coupling a first output power of the first alternative power state via a power chassis to the first information handling system;
detecting a second power demand of the first information handling system using a monitor of the power chassis, wherein the second power demand exceeds the threshold power level;
initiating a second forced reduced power state using the management controller in response to the second power demand exceeding the threshold power level;
initiating a second alternative power state in response to detecting the second forced reduced power state; and
releasing the second forced reduced power state using a BIOS of the first information handling system.

10. A power management system comprising:
a management controller operably coupled to a BIOS of a first information handling system, the management controller configured to manage allocation of power sufficient to satisfy a first power demand of the first information handling system, to detect a first forced reduced power state of the first information handling system, to output a first alternative power level to the first information handling system based on a first alternative power state, wherein the first alternative power level is less than a first threshold level, and to initiate releasing the first forced reduced power state of the first information handling system, to detect a second forced reduced power state of the first information handling system, wherein the second forced reduced power state is greater than the first forced reduced power state and the second forced reduced power state is in response to the first alternative power level exceeding the first threshold level, to output a second alternative power level to the first information handling system based on a second alternative power state, wherein the second alternative power level is less than the first alternative power level;
a monitor accessible to the management controller, the monitor configured to monitor the first power demand; and
a power distribution system coupled to the information handling system, the power distribution system configured to receive a first alternative power output generated in response to the detected first forced reduced power state, and to set the first alternative power state based on the first alternative power output and based on a first profile of the first information handling system, wherein the first profile includes a first specific configuration of components to be powered within the first information handling system, wherein the first alternative power state is set to a power level proximal to the threshold power level, to set the second alternative power state in response to the detection of the second forced reduced power state and based on a second profile of the first information handling system.

11. The power management system of claim 10, wherein the first forced reduced power state is initiated in response to the first power demand exceeding a first threshold level of the first information handling system.

12. The power management system of claim 10, further comprising the management controller configured to:
detect a first forced reduced power state of a second information handling system;
output a second information handling system alternative power level to the second information handling system, wherein the second information handling system alternative power level is less than a second information handling system threshold level; and initiate releasing the first forced reduced power state of the second information handling system.

13. The power management system of claim 12, further comprising:
a second information handling system profile accessible to the management controller to determine the second information handling system alternative power level.

14. The power management system of claim 10, wherein the management controller is configured to determine the first alternative power output using a plurality of configurations and a plurality of utilization levels of the first information handling system.

15. The power management system of claim 10, wherein the management controller is configured to determine a resulting operating state of the information handling system using a power output.

16. An information handling system comprising:
a processor configured to receive a request to invoke a first forced reduced power state, the processor configured to reduce an operating state to a minimal operating level, to detect the first forced reduced power state of the first information handling system, to output a first alternative power level to the first information handling system based on a first alternative power state, wherein the first alternative power level is less than a first threshold level, and to initiate releasing the first forced reduced power state of the first information handling system, to detect a second forced reduced power state of the first information handling system, wherein the second forced reduced power state is greater than the first forced reduced power state and the second forced reduced power state is in response to the first alternative power level exceeding the first threshold level, to output a second alternative power level to the first information handling system based on a second alternative power state, wherein the second alternative power level is less than the first alternative power level; and a power distribution system coupled to the processor and responsive to the first forced reduced power state and the first alternative power state, wherein the first alternative power state is generated in response to a request to initiate the first forced reduced power state received via an out-of-band network signal and based on a first profile of the first information handling system, and wherein the first profile includes a specific configuration of components to be powered within the first information handling system, and the power distribution system is further configured to set the second at alternative power state in response to the detection of the second reduced power state and based on a second profile of the first information handling system.

17. The information handling system of claim 16, wherein the first alternative power state is determined relative to the first forced reduced power state and threshold power level.

18. The information handling system of claim 16, further including:
wherein the processor is configured to receive a second request to initiate a second forced reduced power state after initiating the first alternative power state; and
wherein the energy distribution system is responsive to a second alternative power state, wherein the second alternative power state is generated relative to the first alternative power state and the threshold level.

* * * * *